Sept. 8, 1959 R. G. NYE ET AL 2,903,626

REPAIRABLE PLUG-IN PACKAGE UNIT

Filed Nov. 2, 1953 2 Sheets-Sheet 1

INVENTOR.
R. GLEN NYE
EVERETT EDWARD McCOWN
BY ROBERT HAROLD HARWOOD
George Sipkin
George E. Pearson
ATTORNEYS

REPAIRABLE PLUG-IN PACKAGE UNIT

Filed Nov. 2, 1953 2 Sheets-Sheet 2

INVENTOR.
R. GLEN NYE
EVERETT EDWARD McCOWN
BY ROBERT HAROLD HARWOOD
George Sipkin
George E. Pearson
ATTORNEYS United States Patent Office 2,903,626

Patented Sept. 8, 1959

2,903,626

REPAIRABLE PLUG-IN PACKAGE UNIT

Robert Glen Nye, Everett E. McCown, and Robert H. Harwood, San Diego, Calif.

Application November 2, 1953, Serial No. 389,898

3 Claims. (Cl. 317—101)

(Granted under Title 35, U.S. Code (1952), sec. 266)

The invention described herein may be manufactured and used by or for the Government of the United States of America for governmental purposes without the payment of any royalties thereon or therefor.

This invention relates to an electronics package unit and more particularly to a repairable plug-in package unit which protects the electronic components from environmental hazards and dissipates heat rapidly.

The conventional construction of electronic chassis with tubes in the open and other parts mounted below the mounting board has proved unsatisfactory in many respects, since all the components are exposed to moisture, dust, abrasion, vibration and corrosive fumes, and the testing and repair of equipment constructed in this manner is extremely difficult and time consuming. Many attempts have been made to provide functional units which provide some protection against the environment, but those which are protected are not repairable or, at best, very difficult to repair particularly when enclosed in sheet metal cans, and other functional units which may be readily repaired are not adequately protected from the elements. Other functional units of electronic circuitry have been encapsulated in plastic which gives excellent protection from environmental hazards, but these units are obviously not repairable.

The present invention consists essentially of three basic units, the base and the cap, which are preferably formed of black anodized die cast aluminum for efficient heat absorption and radiation, and the parts board. The base contains a plug for connection to other portions of the equipment, the miniature tube sockets and their supports, the bosses for the captive screws that hold the unit in place, and a slot for supporting the parts board. The cap contains the tube wells with retaining springs and a slot for supporting the upper portion of the parts board. The parts board itself is preferably a slab of insulating material with holes punched and marked and adapted to receive terminals for mounting and interconnection of the various components, such as resistors, condensers, etc. The units may be made in various sizes to accommodate one, two, three, or four miniature tubes. The physical arrangement and construction is such that the tubes are completely shielded from the components on the parts board as well as external fields, and heat transfer, radiation interference, and microphonics are greatly reduced.

One object of the present invention is to provide a repairable plug-in package unit which is small in size, low in weight, and simple and inexpensive to construct and assemble into a complete functional unit.

Another object of the present invention is to provide an electronic package unit which facilitates the rapid and easy maintenance of equipment by replacement of complete functional units which are defective, and wherein each functional unit is easily serviced and rapidly repairable in the field with standard components, tubes and other parts.

A further object of the present invention is to provide a repairable plug-in electronic package unit which increases the time utilization factor of equipment in the field and requires a minimum of spare units and spare parts for complete maintenance.

Still another object of the present invention is to provide a repairable plug-in package unit which is reliable in service and minimizes the effects of environmental hazards, such as moisture, dust, abrasion, vibration and corrosive fumes.

A still further object of the present invention is to provide a construction for repairable plug-in package units which facilitates heat transfer and completely shields the tubes from resistors, condensers and other parts as well as external fields and the effects of radiation interference and microphonics.

Still another object of the present invention is to provide a repairable plug-in electronic package unit which facilitates and simplifies the design of electronic apparatus by simplifying mechanical layout of the circuits and reducing the time between experimental and final production design, and does not require an enclosed cabinet for installation.

Other objects and many of the attendant advantages of this invention will be readily appreciated as the same becomes better understood by reference to the following detailed description when considered in connection with the accompanying drawings wherein.

Figures 1, 2, 3:
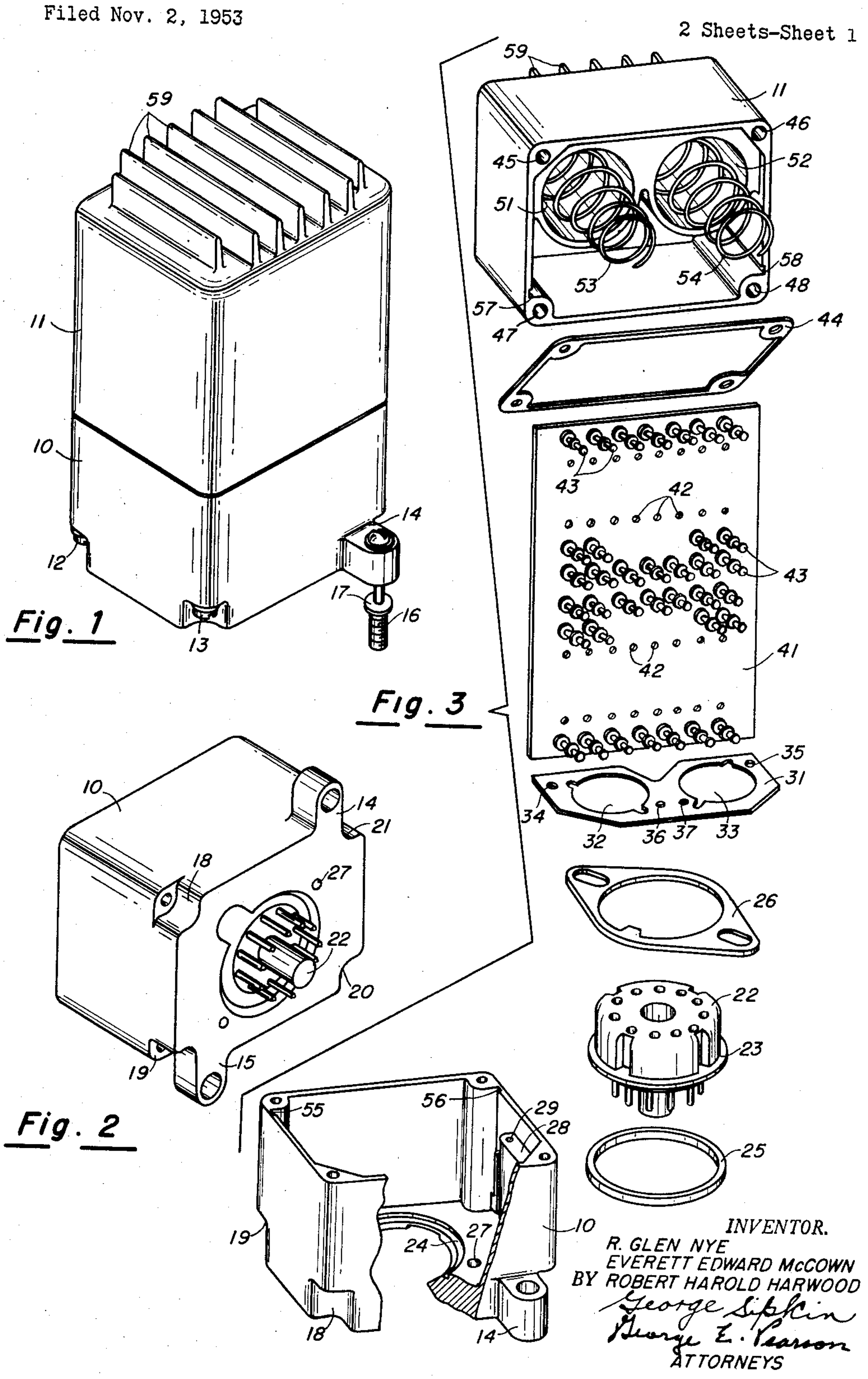
Fig. 1 is an external pictorial view of one preferred embodiment of the present invention for an electronic functional circuit including two tubes.
Fig. 2 is a pictorial bottom view of the base portion of the unit illustrated in Fig. 1.
Fig. 3 is an exploded view of the major parts making up the unit of Fig. 1.

Referring now to the drawings in detail, the package unit as illustrated in Fig. 1 consists of a base member 10 and a cap 11 secured together with cap screws such as those indicated at 12 and 13. The base member 10 is provided with a pair of lugs 14 and 15 through which extend captive screws such as indicated at 16 retained in position by a washer 17. The heads of the cap screws such as 12 and 13 are mounted in suitable recesses, such as those indicated at 18, 19, 20 and 21 in the four corners of the base member 10 in such a manner that they will not interfere with the mounting of the complete unit on a flat surface or chassis.

The base member 10 as illustrated in Figs. 2 and 3, with portions broken away in Fig. 3 to illustrate certain details of configuration, is adapted to receive and mount a conventional pin type plug 22 having a flange 23 which seats in a suitable recess 24 in the base member against a flexible, resilient, sealing ring 25. A suitable plate 26 engages the flange 23 and is secured by suitable cap screws (not shown) engaging threaded openings 27 in the base member 10.

The base member 10 is formed with ledges on opposite sides such as that indicated at 28 provided with threaded openings 29 on which the mounting plate 31 is supported within the base member. The mounting plate 31 is provided with suitably shaped openings 32 and 33 which are adapted to receive conventional tube sockets (not shown)

for mounting therein and receiving tubes preferably of the miniature or sub-miniature type. Mounting plate 31 is also provided with small apertures 34, 35, 36, and 37 which are used to secure the tube sockets thereon, and cap screws (not shown) extending through the openings 34 and 35 also threadedly engage openings such as 29 in ledge 28 and the opposite ledge (not visible in Fig. 3) to secure the mounting plate 31 in position thereon.

A parts board 41 is formed of a slab of insulating material and is provided with rows of suitable openings 42 which may if desired be indicated by numerals or other indices on both sides and are adapted to receive a plurality of pins such as 43 for mounting and connection of the desired components such as resistors, capacitors, etc., as may be desired for the particular circuitry of the functional unit.

A sealing gasket 44 is provided to make a water and air tight joint between the base 10 and the cap 11, and together with the sealing ring 25 provides a complete hermetically sealed enclosure for the electronics circuitry which will resist the elemental hazards due to moisture, dust, corrosive fumes, etc.

The cap 11 is provided with threaded apertures in the four corners thereof, 45, 46, 47 and 48, which are adapted to be engaged by cap screws such as those indicated at 12 and 13. The cap member is also provided with an integrally formed pair of tube walls 51 and 52 in which the spiral springs 53 and 54 are positioned to resiliently engage the top of the tubes which will extend into the tube well 51 and 52. This arrangement provides an excellent shock mounting for the tubes and also shielding of the tubes from the components on the parts board 41, as well as external fields, so that radiation interference and microphonics are greatly reduced.

Both the base 10 and cap 11 are provided with oppositely disposed aligned vertical grooves 55, 56, 57 and 58 which serve to position and support the parts board 41.

The base member 10 and the cap 11 are preferably cast or otherwise formed from aluminum or a similar light weight and heat conducting material and anodized to provide a black or otherwise colored surface which will increase the heat radiation, particularly in conjunction with the fins 59, and the different colors may be utilized for identification of the functional circuits enclosed therein.

The modification shown in Figs. 4 through 7 is similar to the unit illustrated in Figs. 1 through 3, but is adapted for use with a circuit requiring only one tube and is arranged to provide a more compact arrangement with the base plug secured to the base member in a slightly different manner.

This one tube unit is similarly provided with a base member 60 and a cap 61 having fins 62, the base 60 and cap 61 being screwed together by suitable cap screws such as those indicated at 63 and 64. Captive screws such as the one indicated at 65 extending through lugs 66 and 67 are adapted to secure the unit to a mounting surface. A tube mounting plate 68 is provided with a suitably shaped opening 69 for mounting a tube socket (not shown) and a pair of smaller openings 71 and 72 for securing the mounting plate by screws (not shown) secured in the threaded openings 73 in ledges 74 integrally formed in the base member 60.

The base member 60 is also provided with a pair of oppositely disposed vertical grooves 75 and 76 which are adapted to position and support the parts board 77 in an upright position. The parts board 77 is provided with a plurality of openings 78 which may, if desired, be marked with suitable indices and are adapted to mount as many pins 79 as are required for the particular circuitry for mounting the smaller components such as resistors and capacitors.

The cap 61 is likewise provided with a pair of oppositely disposed vertical grooves 81 and 82 which are aligned with grooves 75 and 76 and serve to engage and support the upper portion of the parts board 77. Cap 61 also has a single tube well 83 in which a spiral spring 84 may be mounted for resiliently engaging the top of a tube mounted on the tube mounting plate 68. The walls surrounding the tube well 83 are also preferably cast and form a shielding for the tube from other components and stray fields and interference.

The pin type plug 85 of conventional structure is provided with a flange 86 which engages the annular ridge 87 formed in the base member 60 being held in position by a snap ring 88 engaging a solid ring 89 pressing against a flexible resilient sealing ring 90 which engages the flange 86 to form a tight seal around the plug 85. A sealing gasket 91 is provided for sealing the abutting surfaces of the cap 61 and the base member 60.

If desired, sufficient space may be provided within either of the units for insertion of a small package of some drying agent to eliminate any moisture which may get into the unit during assembly or repair.

If desired, the pins projecting from the base member may be molded in a suitable ceramic or plastic cast into a suitable opening in the bottom of the base plug to provide a plug-in pin connection with a water tight joint. It will be apparent that other conventional types of electrical connecting members may be utilized in place of the pin type plug disclosed.

It will be obvious that units constructed in accordance with the present invention may be made to accommodate one, two, three or more tubes depending on the functional circuit involved and will remain the same depth and height but merely differ in width or one dimension only. Therefore the units may be positioned side by side in arranging a neat compact mechanical layout for electronic apparatus, and only sufficient space need be provided for adequate ventilation between the units.

Figures 4, 5, 6:
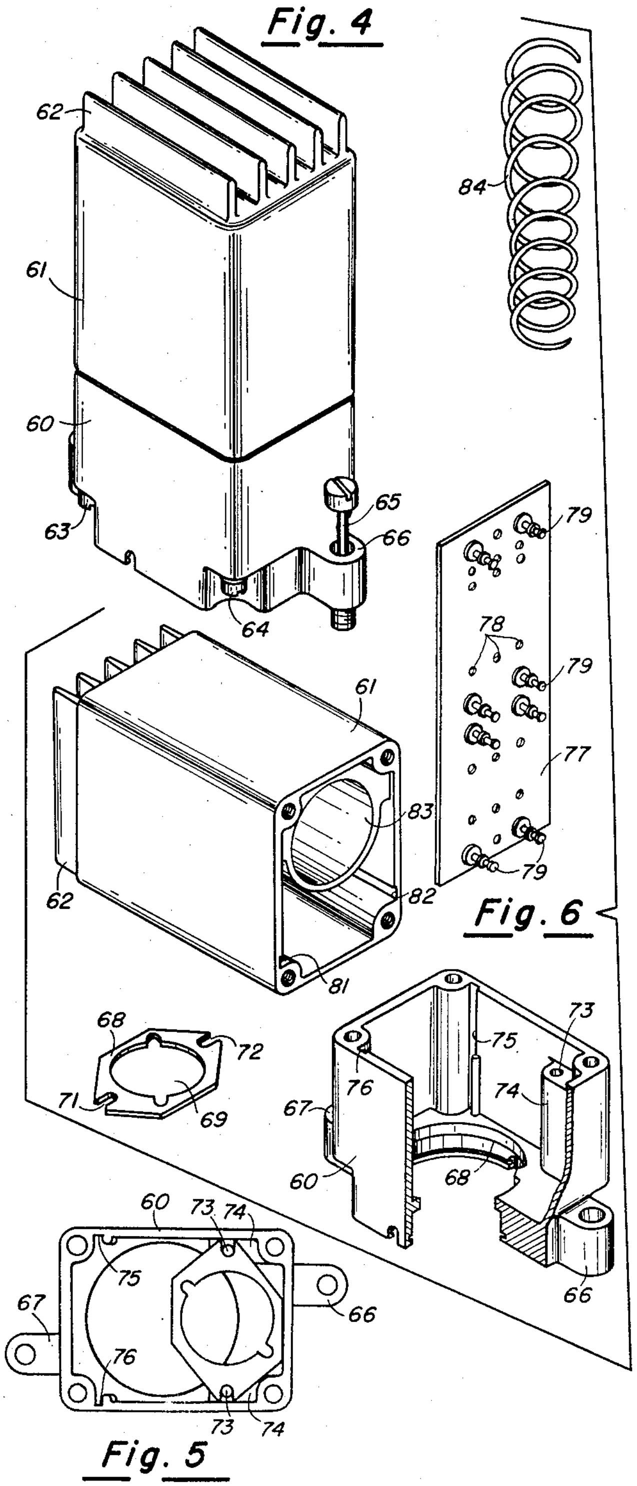
Fig. 4 is an external pictorial view of a modified one tube unit constructed in accordance with the present invention.
Fig. 5 is a top plan view of the base portion of the unit shown in Fig. 4.
Fig. 6 is an exploded view of the base portion and cap of the unit showing certain of the elements associated therewith.
Figure 7:
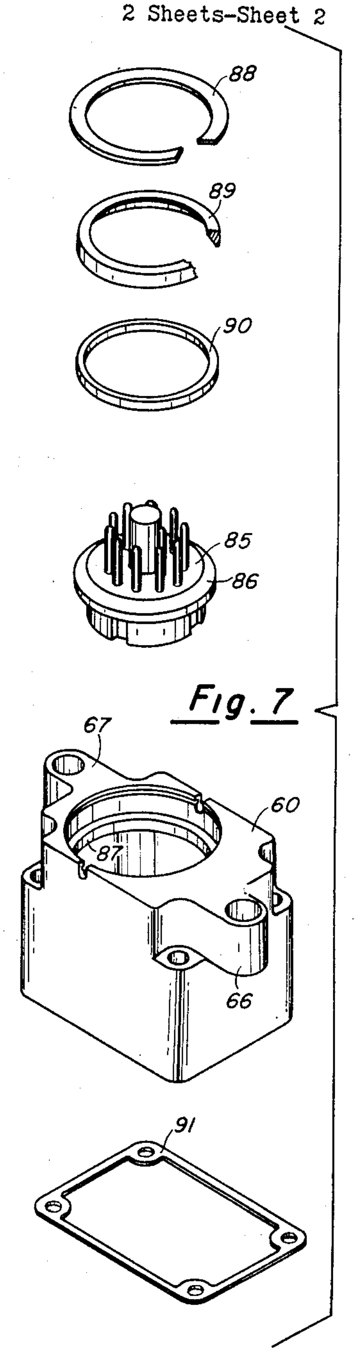
Fig. 7 is an exploded view of the base portion and the socket with mounting elements fitting into the bottom thereof.

In the use of the package unit as disclosed herein, the smaller components such as the resistors and capacitors are soldered or otherwise connected to the terminals, such as 43 in Fig. 3 and 79 in Fig. 6 and interconnected in accordance with the circuit design. These components are then connected to the terminals of the tube sockets which have been mounted on the mounting plate, such as 31 in Fig. 3 and 68 in Fig. 6. Other connections are made between the proper points on the terminal board and the tube sockets to the pins on the pin plug, such as 22 in Fig. 3 and 85 in Fig. 7. These connections should be made with wires sufficiently long to permit subsequent insertion of the pin plugs 22 or 85 in the base member 10 or 60 followed by proper mounting of the tube mounting plate 31 or 68 on the ledges, such as 28 or 74. The parts board 41 or 77 is then inserted in the slots in the base member 10 or 60. The sealing gasket 44 or 91 is then placed in position on the base member and the cap slid down over the parts board with the grooves therein engaging the edges of the parts board to hold it firmly in an upright position.

Any number of these functional units consisting of one, two, three, or four or more tubes may be combined in a single chassis merely by providing female plugs for reception of the male plugs such as 22 and 85 and interconnecting the proper terminals on the female plugs to provide a complete electronic apparatus. It will be apparent that any one of the functional units which is found defective can be readily replaced merely by unplugging and substituting a new unit, and the defective unit can be readily repaired by disassembling and checking the individual components, wiring and tubes thereof.

Obviously many modifications and variations of the present invention are possible in the light of the above teachings. It is therefore to be understood that within the scope of the appended claims the invention may be practiced otherwise than as specifically described.

What is claimed is:

1. A package unit for protecting electronic components from environmental hazards comprising the combination of means constituting a container for substantially enclosing and substantially sealing electronic components therein and means for supporting electronic components within the enclosing and sealing means; said means for supporting and sealing comprising a hollow base member having an open end and an opening in another end, means for supporting and for sealing an electrical plug in the said opening, a cap member having a substantially hollow interior and a means for resiliently engaging a tube supported within the container, means for mounting a tube within the base member, means for sealing and securing the base member and cap member together, said means for supporting comprising means for firmly supporting a parts board within the base member and cap member and a parts board which is firmly supported within the container.

2. A package unit for protecting electronic components from environmental hazards comprising the combination of means constituting a container for substantially enclosing and substantially sealing electronic components therein and means for supporting electronic components within the enclosing and sealing means; said means for supporting and sealing comprising a hollow base member having an open end and an opening in another end, means for supporting and for sealing an electrical plug in the said opening, and a cap member having a substantially hollow interior and a means for resiliently engaging a tube supported within the container, means for mounting a tube within the base member, means comprising a sealing gasket for sealing and securing the base member and cap member together to provide a water and air tight joint therebetween, said means for supporting comprising means for firmly supporting a parts board within the base member and cap member and a parts board which is firmly supported within the container.

3. A package unit for protecting electronic components from environmental hazards comprising the combination of means constituting a container for substantially enclosing and substantially sealing electronic components therein to provide a complete hermetically sealed enclosure for electronic circuitry and means for supporting electronic components within the enclosing and sealing means; said means for supporting and sealing comprising a hollow base member made of relatively light weight and heat conducting material having an open end and an opening in another end, means comprising a sealing ring for supporting and for sealing an electrical plug in the said opening, and a cap member made of relatively light weight and heat conducting material having a hollow interior and a means for resiliently engaging a tube supported within the container, means for mounting a tube within the base member, means for sealing and securing the base member and cap member together, said means for supporting comprising means for firmly supporting a parts board within the base member and cap member and a parts board which is firmly supported within the container.

References Cited in the file of this patent

UNITED STATES PATENTS

| | | |
|---|---|---|
| 1,994,614 | Lansing | Mar. 19, 1935 |
| 2,440,308 | Storck | Apr. 27, 1948 |
| 2,497,963 | Singer | Feb. 21, 1950 |
| 2,499,589 | Kennedy | Mar. 7, 1950 |
| 2,619,513 | Wolfenbarger | Nov. 25, 1952 |
| 2,628,270 | Himmel | Feb. 10, 1953 |
| 2,745,895 | Lideen | May 15, 1956 |
| 2,762,987 | Mackey | Sept. 11, 1956 |
| 2,825,009 | McCoy | Feb. 25, 1958 |

FOREIGN PATENTS

| | | |
|---|---|---|
| 507,108 | Great Britain | June 9, 1939 |
| 635,305 | Great Britain | Apr. 5, 1950 |